US007293251B2

(12) United States Patent
Zeman et al.

(10) Patent No.: US 7,293,251 B2
(45) Date of Patent: *Nov. 6, 2007

(54) INITIATING AND DEBUGGING A PROCESS IN A HIGH ASSURANCE EXECUTION ENVIRONMENT

(75) Inventors: Pavel Zeman, Kirkland, WA (US); Nathan T. Lewis, Sammamish, WA (US); Kenneth D. Ray, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 507 days.

This patent is subject to a terminal disclaimer.

(21) Appl. No.: 10/759,818

(22) Filed: Jan. 16, 2004

(65) Prior Publication Data

US 2004/0221271 A1 Nov. 4, 2004

Related U.S. Application Data

(63) Continuation of application No. 10/428,678, filed on May 2, 2003.

(51) Int. Cl.
*G06F 9/44* (2006.01)
(52) U.S. Cl. ........................ 717/100; 717/124
(58) Field of Classification Search ............... 717/124, 717/127
See application file for complete search history.

(56) References Cited

U.S. PATENT DOCUMENTS 5,794,046 A * 8/1998 Meier et al. ............... 717/128
6,058,393 A * 5/2000 Meier et al. ................ 707/10

2003/0120979 A1 * 6/2003 Lee et al. ................... 714/38

OTHER PUBLICATIONS

Saha et al., "Harnessing Windows NT for High Performance Computing", HiPC'99, LNCS 1745, pp. 66-70, 1999, Springer-Verlag Berlin Heidelberg 1999—retrieved Dec. 4, 2006 from Google.*
Leblanc, T.J.; Mellor-Crummey, J.M., "Debugging Parallel Programs with Instant Replay", IEEE Transactions on Computers, vol. C-36 Issue: 4 Apr. 1987, pp. 471-482—retrieved Dec. 5, 2005 from ACM.*
Zandy et al., "Process Hijacking", High Performance Distributed Computing, 1999. Proceedings. The Eighth International Symposium, p. 177-184—retrieved Dec. 5, 2006 from Google.*

(Continued)

*Primary Examiner*—Wei Y. Zhen
*Assistant Examiner*—Philip Wang
(74) *Attorney, Agent, or Firm*—Woodcock Washburn LLP

(57) ABSTRACT

Bifurcated processes, in which a shadow process in a first environment is controlling thread scheduling for a trusted agent in a second, high assurance environment, can be debugged via a two-phase initialization of the debugger. In the first phase, initial set up is accomplished for the trusted agent, but no shadow process will schedule execution for any thread of the trusted agent. The debugger will then be attached. In a second phase, the shadow process will begin scheduling threads for the trusted agent. In order to allow the debugger access to the process memory of the trusted agent or to set or get information regarding a particular thread of the trusted agent, a thread which is either a thread belonging to the trusted agent or belonging to the second execution environment and matched with the trusted agent is used. This admin thread is used to perform the work of retrieving process memory and information regarding threads of the trusted agent, allowing such information from the high assurance environment to be found and used in the debugger in the first execution environment.

40 Claims, 5 Drawing Sheets

OTHER PUBLICATIONS

Aguilera, M.K. et al., "Performance Debugging for Distributed Systems of Black Boxes", *ACM Symposium on Operating Systems Principles, Proceedings of the nineteenth (19th) ACM Symposium on Operating Systems Principles*, 2003, 74-89.

Elshoff, I.J. P., "A Distributed Debugger for Amoeba", *Workshop on Parallel & Distributed Debugging, Proceedings of the 1988 ACM SIGPLAN and SIGOPS Workshop on Parallel and Distributed Debugging*, 1989, 1-10.

Satyanarayanan, M. et al., "Transparent Logging as a Technique for Debugging Complex Distributed Systems", *Proceedings of the 5th Workshop on ACM SIGOPS European Workshop: Models and Paradigms for Distributed Systems Structuring*, 1992, 1-3.

Whittaker, J.A. et al., "Black Box Debugging", *Queue*, 2003, 1(9), 68-74.

* cited by examiner

INITIATING AND DEBUGGING A PROCESS IN A HIGH ASSURANCE EXECUTION ENVIRONMENT

CROSS-REFERENCE TO RELATED APPLICATIONS

This application is a continuation of U.S. patent application Ser. No. 10/428,678 filed May 2, 2003 entitled "User Debugger For Use On Processes Running In A High Assurance Kernel In An Operating System" which is herein incorporated by reference in its entirety.

FIELD OF THE INVENTION

The present invention relates generally to the field of debuggers. More particularly, the invention relates to the use of plural execution environments in tandem, and provides techniques that support the use of a debugger to debug a process running in one of the execution environments, where the execution environment in which the process is running is a secure execution environment is a high assurance execution environment, subject to security constraints on behavior.

BACKGROUND OF THE INVENTION

Generally, a debugger is a tool, often a computer program, which is designed to help find errors in another program by allowing a user to step through the target program and examine data and check conditions relating to the execution of the program. This is done in order to allow analysis of a program in its running state, thereby providing a tool for troubleshooting problems and/or otherwise improving the performance of the program.

A debugger works by "attaching" to a particular process (the "debuggee" or "target" process) and, typically, by performing some or all of the following operations, either under the control of a user or in response to calls or conditions in the debuggee process:
(1) read and/or write process memory for the debuggee process;
(2) get and/or set the thread context for the debuggee process;
(3) control running threads of the debuggee process; and
(4) handle debug events that occur in the debuggee process.

The debugger can not directly perform these functions for or on the debuggee, since in general operating systems protect processes from each other, including their specific data, registers, control information, and any other like state of a given process. For example, operating systems do not generally allow one process to access process memory or thread context of another process. Instead of such direct access between threads, the kernel of a given operating system, or some other privileged software acting on behalf or instead of the kernel, mediates between the debugger process and debuggee process. For example, when a debugger process would like to get the context for a thread of the debuggee process, the kernel first receives the request, verifies that the debugger has the correct permissions to perform the requested action, and, if it does, provides the debugger with the requested portions of the debuggee process' thread context (for a read) or writes the requested data to the debuggee process' thread context (for a write).

Remote debugging is used when a debugger is run on a first system and the program being debugged ("debuggee" program) is running on a second system. In order to facilitate this remote debugging, a "debug stub" also runs on the second system. Remote debugging allows the debugger user interface to run on the first system in order to debug the debuggee program, which provides flexibility for the user of the debugger program where, for example, running the debugger program on the second system is not convenient or feasible. The debug stub serves as a surrogate for the debugger on the second system. When the debugger wishes to get the context for a thread of the debuggee process on the second system, for example, the request is passed to the debug stub, which communicates with the kernel on the second system and obtains the information.

However, it may be desirable to allow two execution environments (either in a single computing environment or in more than one computing environment) to interact with each other while preventing events at one of the execution environments from undermining the ability of another to behave as it is expected to behave. For example, two or more operating systems that run on a single machine are examples of execution environments that may need to interact with each other in a single computing environment. If this is the case, and one of the execution environments includes a high assurance component whose behavioral specification requires it not to "leak" information outside of itself, it can be appreciated that such a high assurance component (such as a high assurance operating system) cannot trust another kernel with the task of dispatching a thread, since the act of dispatching the thread would necessarily give the dispatching operating system access to the thread's register contents. Additionally, there are various other types of attacks to an operating system that are based on scheduling threads to run at inappropriate times (e.g., running threads that have been designated as not runnable, or running a thread that is already running).

In such a case, it may be desirable for a first operating system to make scheduling decisions about certain of the second (high assurance) operating system's processes (e.g., how to account for a thread's priority), but the ultimate dispatch of the second operating system's processes is performed by the second operating system—which can protect itself from an attack by refusing to perform the dispatch if conditions are not appropriate to run the thread. For processes that are to work in this bifurcated manner ("bifurcated processes"), a first "trusted agent" or "work process" is created in the second operating system, and a corresponding "shadow process" is created in the first operating system. Where processes include multiple threads, multiple bifurcated threads are created. The thread scheduler of the first operating system is used to schedule the threads of the trusted agent by scheduling the shadow process to run.

Whenever a thread of a shadow process is dispatched, the ultimate effect is to run the corresponding thread of the corresponding trusted agent in the second operating system. The mechanism by which the trusted agent is invoked is via the shadow process. When the shadow process is dispatched, a service exposed to shadow processes allows a change of context to the second operating system with a request that the corresponding trusted agent process be run. The trusted agent threads in the second operating system may be referred to as "work threads" because these are the threads that will actually perform the substantive work that needs to be done in the second operating system. These trusted agent threads are in contrast to the shadow threads, whose function is to be schedulable by the first operating system's scheduler so that they can invoke the trusted agent threads. In most cases, the second operating system can validate the appropriateness of such invocations; in this way, the use of the first operating system cannot cause the high assurance second operating system to behave in an unintended manner by incorrectly scheduling operating system's threads.

Shadow threads may be created by an agent of the second operating system that execute inside of the first operating system. These threads communicate with the second operating system. When the second operating system creates a thread, it informs the shadow process that the new thread has been created, and also informs the shadow process of the new thread's internal thread ID. The shadow process then instantiates a new shadow thread in the first operating system. The new shadow thread knows the thread ID that has been communicated to the shadow process. When the shadow thread runs and invokes a context switch back to the second operating system, the shadow thread uses the thread ID to instruct the second operating system which thread should be started.

In such a two execution environment context, because of the high assurance nature of one environment, it may not be advisable to allow a debugging process running on the first operating system to debug a target process which runs on the high assurance second execution environment. (Such a process running on a high assurance execution environment is termed a "trusted agent"). A debugger may not be available on the high assurance environment, or it may be inadvisable to allow the use of such a debugger to maintain the assured nature of the environment. Similarly, a debug stub may be unavailable for an environment or it may not be advisable to use a debug stub in an environment in order to maintain the assured nature of the environment. Where shadow threads are being used, the traditional methods of remote debugging with a debug stub can not be used, as each process is scheduled in one environment but the context and other process information is stored in the high assurance second execution environment. Thus the traditional methods of remote debugging can not be used.

In order to allow debugging to occur in the face of the high assurance environment running the target process, a debugger may be allowed to attach to the shadow process, and to receive scheduling information via the shadow process. Requests for any information relating to debugging which can not be gleaned from an examination of the shadow threads of the shadow process is passed to the high assurance environment. This concept is described in U.S. patent application Ser. No. 10/428,678, "User Debugger For Use On Processes Running In A High Assurance Kernel In An Operating System."

However, in such a situation, when starting up debugging of a process there is no opportunity to stop the trusted agent process for debugging at the initiation of the trusted agent process. In addition, in order to collect information from the second, high assurance environment, the debugger must be able to provide information regarding the current state of the trusted agent.

A debugger, to function fully, must have the capability to cause execution of the threads of the trusted agent to stop. But, in the situation detailed above where a debugger attaches to the shadow process, when the threads of the trusted agent are stopped for debugging by stopping the shadow threads, for example when the trusted agent is halted or being stepped through, these threads can not provide the requested information regarding the thread context.

In view of the foregoing there is a need for a system that overcomes the drawbacks of the prior art.

SUMMARY OF THE INVENTION

A bifurcated process which is to be debugged is initialized in stages. In one embodiment, in a first stage, the shadow process in the first execution environment is initialized. After this has occurred, a message is sent to the second execution environment to initialize a trusted agent process. The message includes a request to initialize the trusted agent process in debug mode and information on how to set up the trusted agent process. The debugger is then attached to the shadow process. Only after this occurs is the shadow process allowed to schedule execution of trusted agent threads. In this way, breakpoints which occur at the beginning of execution may be set for the bifurcated process and debugging can proceed in this way.

Additionally, during the set up a unique process identifier is sent to the second execution environment which identifies the shadow process. In one embodiment, unique thread identifiers are sent which identify shadow threads. The second execution environment persists this information so that requests for process memory and thread context which are received from the debugger can be matched to the correct second execution environment processes and threads. The debugger can pass a request message for getting and setting thread context and for process memory. The shadow process identifier or shadow thread identifier for the relevant process or thread is included in the request. It is then used to verify which resource is being referred to in the request. It may also be used to determine whether debugging has been permitted on the requested resource. Once the requested action has been performed, a response is prepared and transmitted to the first execution environment.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

When two operating systems run side-by-side on a single machine, they may need to engage in certain types of interaction with each other. One such interaction involves the use of bifurcated processes. The present invention provides techniques that support the debugging of such bifurcated processes, allowing debugging to commence before the start of the bifurcated process and to collect information regarding the context of the process. In addition, in order to collect information from the second, high assurance environment, the debugger must be able to specify process and thread identifiers for the specific thread in the second high assurance environment for which information is required.

A debugger, to function fully, must have the capability to cause execution of the threads of the trusted agent to stop, and to discover their thread context. But, in the situation detailed above where a debugger attaches to the shadow process, when the threads of the trusted agent are stopped for debugging by stopping the shadow threads, for example when the trusted agent is halted or being stepped through, these threads can not provide the requested information regarding the thread context.

In addition, when information regarding the debugged trusted agent or one of its threads is needed for debugging, an admin thread running in the second, high assurance environment can be used. This admin thread may be owned by the trusted agent and used only for debugging, or, in an alternative embodiment, is owned by the second, high assurance environment.

Exemplary Computing Arrangement

Figure 1:
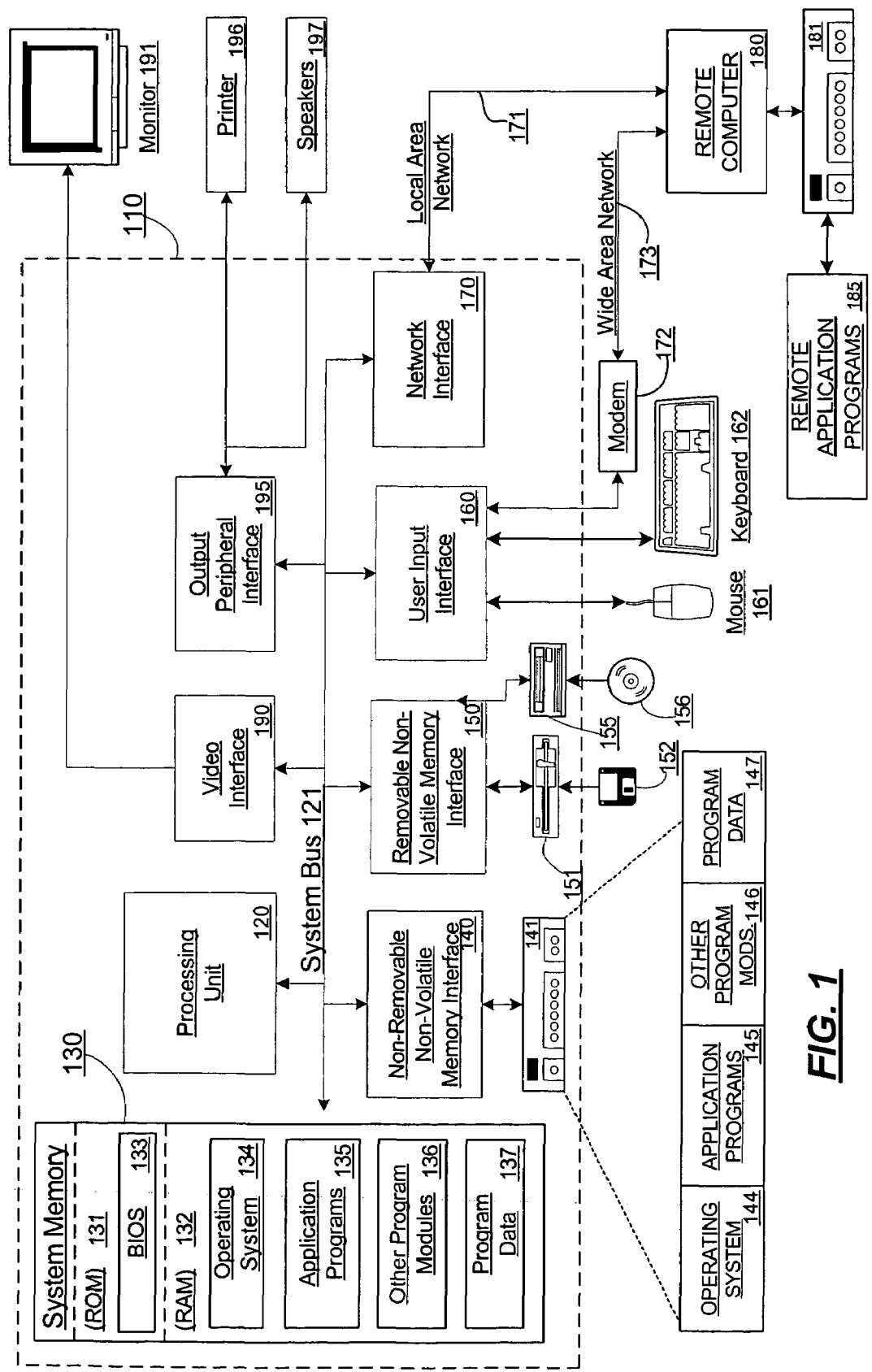
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those implemented on a multi-threaded processor.

The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Plural Execution Environments on a Single Machine

Figure 2:
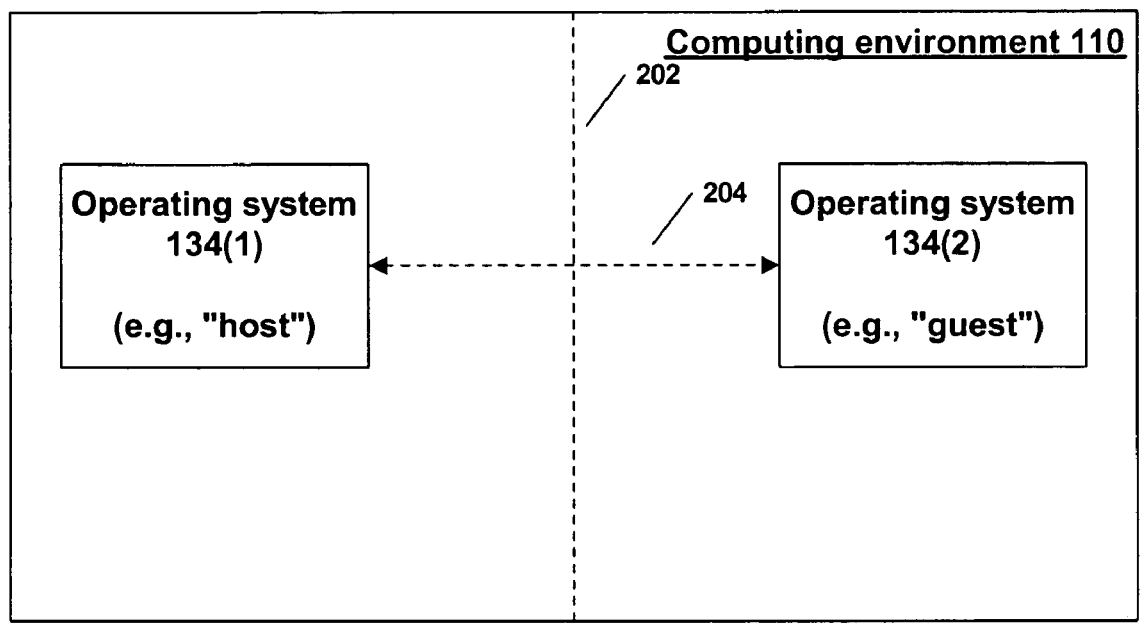
FIG. 2 is a block diagram two exemplary execution environments that maintain some interaction with each other and some separation from each other.

Two operating systems can execute side-by-side on a single computing device. FIG. 2 shows a system in which two operating systems 134(1) and 134(2) execute on a single computer (computing environment 110.) Some type of logical separation 202 exists between operating systems 134(1) and 134(2), such that a certain amount of interaction 204 is permitted between operating systems 134(1) and 134(2), while still allowing at least one of the operating systems to be protected against events that originate in the other operating system.

Operating system 134(2) may be a "high-assurance" operating system, the kernel of which will be referred to herein as a "nexus." A "high assurance" operating system is one that provides a certain level of assurance as to its behavior. For example, a nexus might be employed to work with secret information (e.g., cryptographic keys, etc.) that should not be divulged, by utilizing a curtained memory that is guaranteed not to leak information to the world outside of the nexus, and by permitting only certain certified applications to execute under the nexus and to access the curtained memory. Since the expectation that the nexus will behave according to its specification may be higher than the expectations imposed on the main operating system, the nexus should not interact with the main operating system in any way that would allow events happening at the main operating system to compromise the behavior of the nexus.

When the kernel of operating system 134(2) is a nexus, it is desirable to construct separation 202 such that operating system 134(2) can interact with operating system 134(1) in order to borrow operating system 134(1)'s infrastructure, while still allowing operating system 134(2) to protect itself from actions (either malicious or innocent) that arise at operating system 134(1) and might cause operating system 134(2) to behave in a manner contrary to its behavioral specifications. (It will be understood, however, that the invention is not limited to the case where the kernel of operating system 134(2) is a nexus.) Techniques are disclosed herein that allows separation 202 to be constructed so as to allow for this balance of interaction and protection.

Debugging in Plural Computing Environments with Shadow and Trusted Agent Threads As described above, it may be desirable to allow two execution environments (either on a single machine or on more than one machine) to interact with each other while preventing events at one of the execution environments from undermining the ability of another to behave as it is expected to behave. For example, as described above, one of the execution environments may be high security and contain a nexus. In this case and other plural computing environments, it may be useful to bifurcate threads, so the nexus does not need to contain a thread scheduler for these threads. This allows the nexus to be smaller and simpler, reducing the possibility that secure information may be leaked. Bifurcated threads consist of a shadow thread in a first execution environment, which will be scheduled by the scheduler of the first execution environment, and a trusted agent thread in a second execution environment, which is associated with the actual process memory and thread context for the thread and actually performs the work associated with the bifurcated thread. The scheduler of the first execution environment schedules the shadow thread as it would any other thread in the first execution environment.

Just as processes may involve a multiplicity of threads, a bifurcated process may use more than one thread. Each of the threads of a bifurcated process will have a trusted agent thread in the second operating system and a corresponding shadow thread in the first execution environment.

Figure 3:
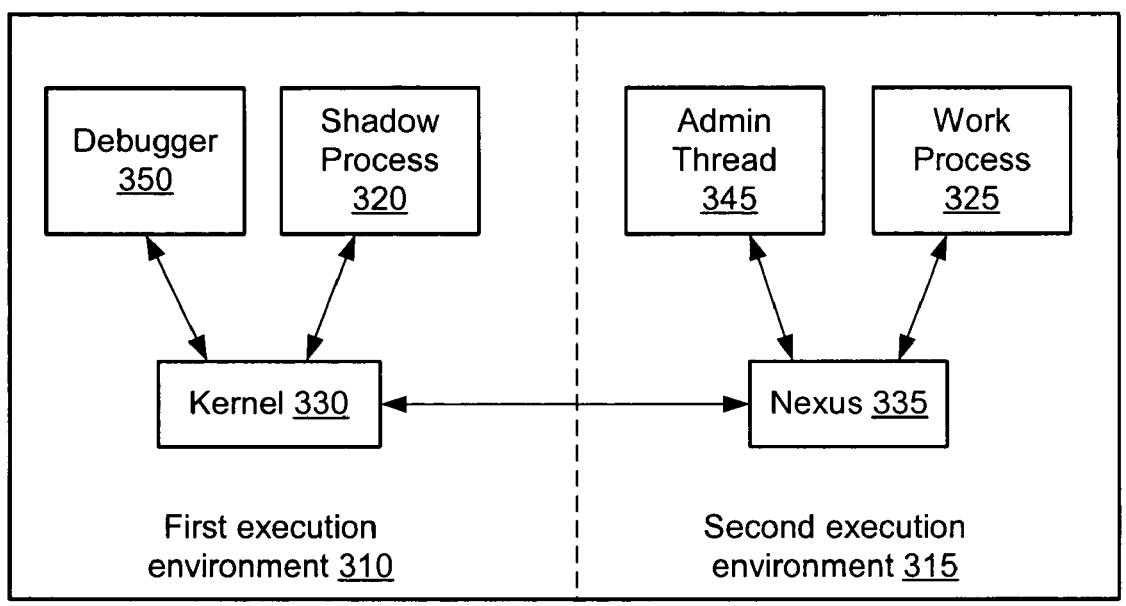
FIG. 3 is a block diagram of the system comprising dual execution environments.

FIG. 3 is a block diagram of a system comprising dual execution environments. In order to debug bifurcated programs, as shown in FIG. 3, a debugger 350 runs on the first execution environment 310. While debugger 350 is depicted in FIG. 3 as a process running in first execution environment 310, the invention is not so limited, and any debugger which can act on processes in first execution environment 310 is contemplated. For example, a remote debugger may be used in combination with a debug stub in the first execution environment.

The debugger 350 attaches to the shadow process 320, and interacts with the shadow process 320 and the kernel 330 of first execution environment 310. Shadow process 320 is the shadow process of a bifurcated process, and the companion to shadow process 320 is trusted agent 325, which runs on nexus 335 in second execution environment 315. While in FIG. 3, a nexus 335 is shown in second execution environment 315 implying that second execution environment 315 is a high assurance execution environment as described above, the invention is not limited to systems which include a high assurance execution environment. Shadow process 320 and its constituent threads are scheduled by the scheduler of the first execution environment 310 and, when it runs, simply performs a context switch to threads of trusted agent 325. The bifurcated process can be thought of, for scheduling purposes, as shadow process 320. In first execution environment 310 there may be debugging infrastructure which provides debugging information regarding shadow process 320, such as how frequently shadow process 320 runs, how frequently and how shadow process 320 fails/crashes and in what ways, and other statistics regarding the performance of shadow process 320 in first execution environment 310.

However, while shadow process 320 is a process with its own context and process memory, the actual work for the process conceptually bifurcated into shadow process 320 and trusted agent 325 is performed by trusted agent 325. Therefore, to debug this bifurcated process, according to the present invention, the process state (thread contexts and process memory) for trusted agent 325 must provided to the debugger 350, along with notification of debug events occurring in trusted agent 325.

Two-Phase Initialization of Debugging of Bifurcated Processes

A developer or other user of a debugger may have the need to start debugging a bifurcated process before any of the actual work of the bifurcated process (as opposed to the setting up of the bifurcated process) occurs. In order to allow this, the initialization process for the bifurcated process must allow the opportunity to attach a debugger before the trusted agent 325 begins executing.

In order to allow this, in a first phase, the shadow process 320 is started by the user. The shadow process is started in a debug-friendly mode. In one embodiment, in order to start the shadow process, an agent image is sent by the shadow process 320 to the nexus 335. The nexus 335 receives the agent image and performs any necessary validation tests to ensure that the trusted agent 325 should be allowed to execute in second execution environment 315. If so, the nexus 335 lays out the process structures in memory and otherwise initializes trusted agent 325. The first trusted agent user-mode instruction for trusted agent 325 is not, however, allowed to begin execution, because no trusted agent thread is scheduled. Instead, the nexus 335 signals the first execution environment 310. Upon receipt of this signal, the debugger can be attached to the shadow process 320 and initial breakpoints can be set. This allows the debugger to set breakpoints before the execution of the first trusted agent user mode instruction. In the second phase, now that the debugger is attached, bifurcated process can be allowed to begin execution. An event is sent to the second-execution environment 315 indicating that the debugger has been attached and is ready to begin. Upon receipt of this event, the trusted agent 325 begins execution from the trusted agent main entry point. This execution occurs when the main thread of the agent is scheduled to run.

The scheduling of threads likewise is dependent on which phase of the debugging entry process the bifurcated process is currently in. In the first phase, which lasts until the debugger attachment and setup is completed, the shadow process 320 does not schedule threads to be run. In the second phase, once the debugger is attached, the shadow process can schedule threads to be run.

Figure 4:
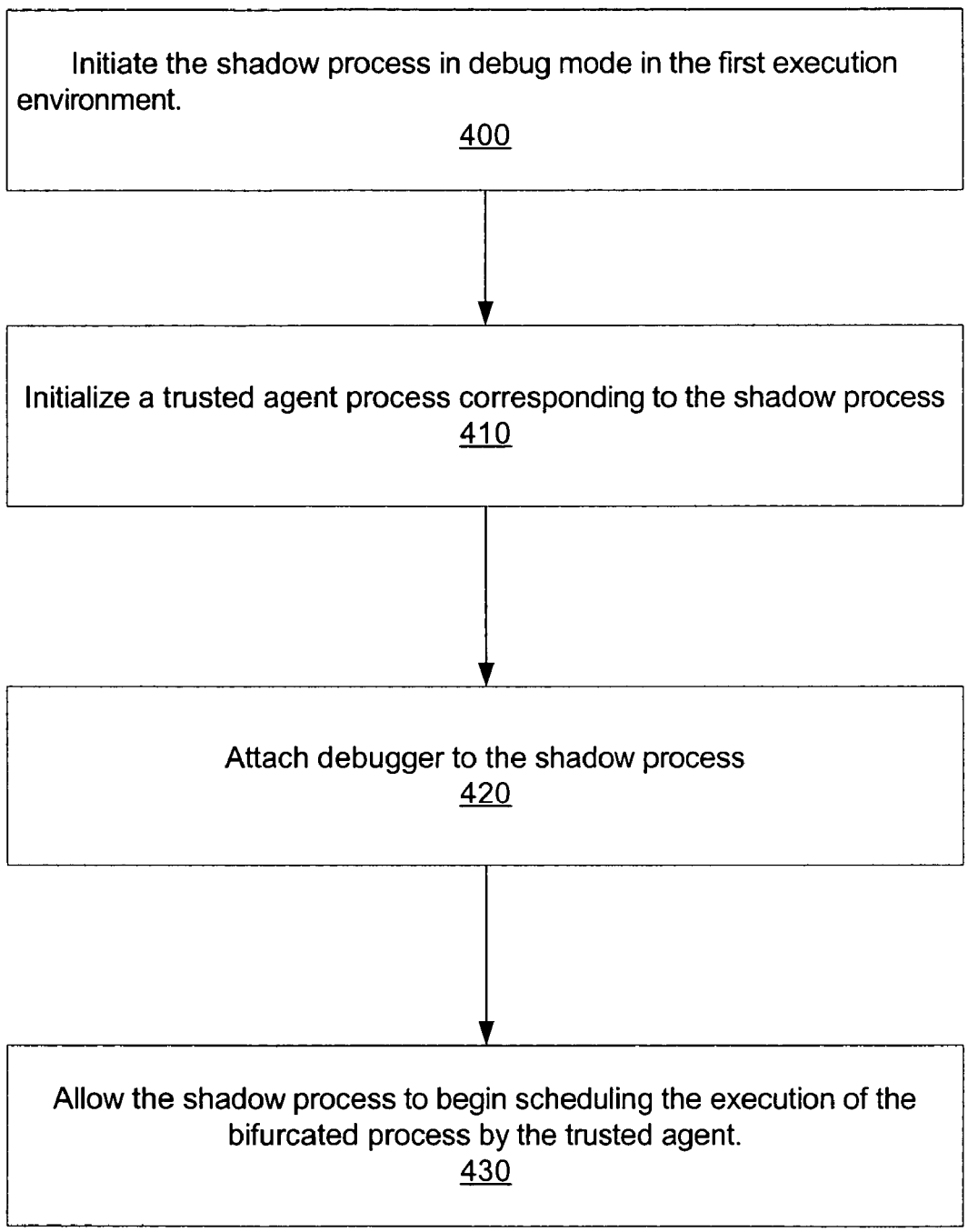
FIG. 4 is a flow diagram describing a method for initiating a bifurcated process to be debugged by a debugger.

In this way, the bifurcated process can be debugged from the initiation of execution of instructions by the trusted agent 325. FIG. 4 is a flow diagram describing a method for initiating a bifurcated process to be debugged by a debugger. In step 400, the shadow process is initiated in debug mode in the first execution environment. In step 410, the trusted agent process is initiated in the second execution environment. In step 420, a debugger is attached to the shadow process. In step 430, the shadow process is used to schedule the execution of the process by the trusted agent.

In one embodiment, a bifurcated process may only be debugged if it is specifically identifiable as a debuggable process. For example, the bifurcated process may have a debugging flag which is set to indicate that the bifurcated process may be debugged. This prevents attacks where an adversary would gain sensitive information by using a debugger to debug a bifurcated process which has access to the sensitive information. Thus, only processes without the debug flag set would be trusted with sensitive information, and only processes with the debug flag set would be allowed to be debugged.

Receiving Information Regarding the Debugged Process without Running Code in its Environment With reference again to FIG. 3, when a trusted agent 325 is being debugged, its threads may be halted by the debugger in order to analyze its process memory or to set or get thread information regarding a thread of trusted agent 325. A problem arises because the threads of the trusted agent 325 are blocked. Because the debugger 350 is running in the first execution environment 310 (or elsewhere, but not in the second execution environment 315) there must be a way for the debugger 350 to examine the necessary process memory or thread information on the second execution environment side. The normal execution threads of the trusted agent 325 can not be used for this purpose. Thus a separate thread, the admin thread 345, is used to allow the debugger 350 to obtain information from the second execution environment 315 about the threads of the trusted agent 325. The admin thread 345 may be a thread of the trusted agent 325 present in addition to the normal execution threads required to perform the work of trusted agent 325. In an alternate embodiment, as shown in FIG. 3, the admin thread 345 is a separate thread from the trusted agent 325, however, it is associated with trusted agent 325. This admin thread 345 is scheduled by the shadow process 320 or by a shadow admin thread in the first execution environment.

When the debugger needs to perform an action in the context of the second execution environment 315, such as a read or set of process memory or thread information, the debugger places a request message on the queue in the first execution environment 310. The next time the admin thread is scheduled to run by the first execution environment, this request message is copied to the second execution environment. The admin thread reads the request message and performs the desired action.

In order to read or write virtual memory, where the process memory or thread information may be stored, in one embodiment, the physical page that is being read from or written to needs to be mapped into the thread context of the admin thread 345. In one embodiment this occurs when the page directory of the trusted agent 325 being debugged is found, and used to map the actual virtual page or pages that the request in the message is targeted to. The way this is done may vary by the platform of the second execution environment 315. For example, where the second execution environment 315 is an x86 platform, the last context of a thread can be found on the stack in the form of a saved trap frame. This information is translated into the requested thread context structure.

When the admin thread 345 has performed the action requested by the debugger 350, the queue is used again to send a return message from the admin thread 345 back to the debugger 350, which contains a notification that the event was successfully processed. If data was requested, for example reading virtual process memory or getting thread context, then the data will be included in the return message for the debugger 350.

Figure 5:
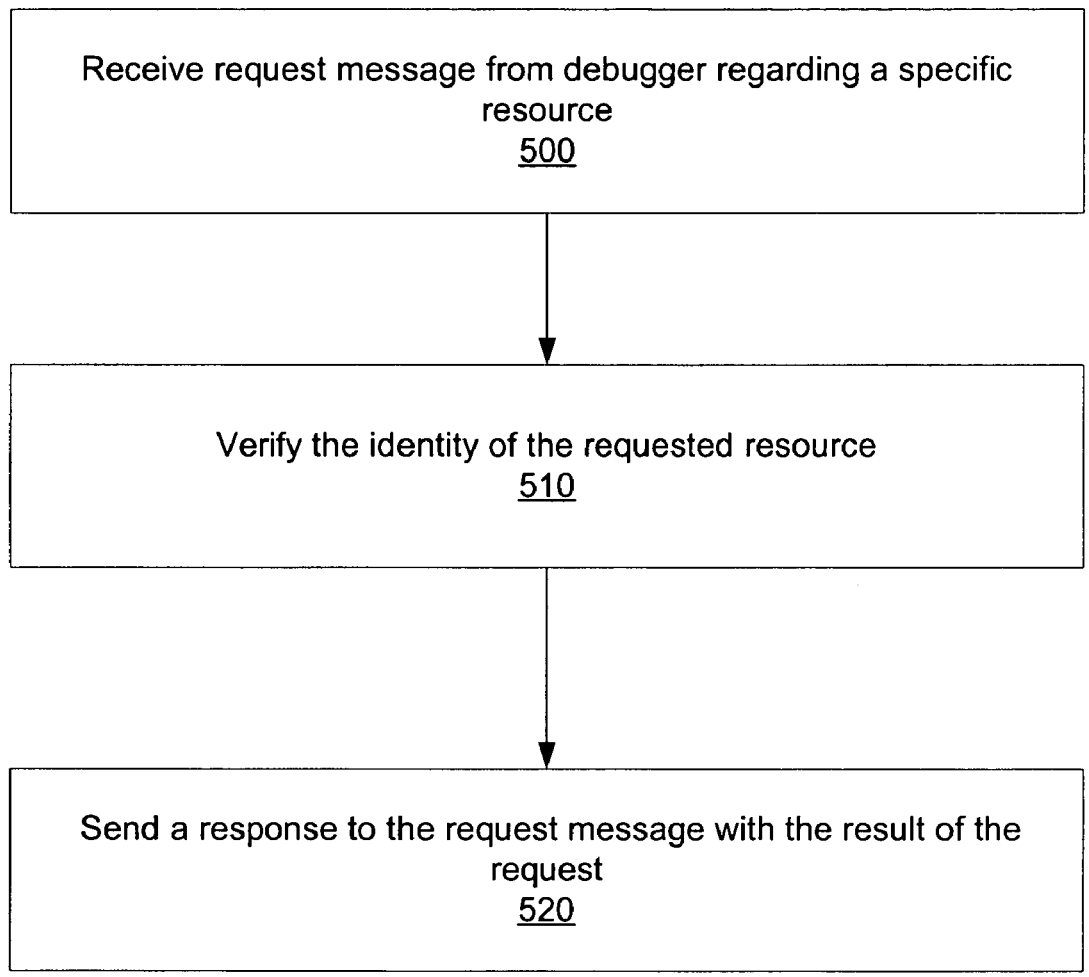
FIG. 5 is a flow diagram describing a method for debugging a bifurcated process.

FIG. 5 is a flow diagram describing a method for debugging a bifurcated process. In step 500, a request message is received in the second execution environment from a debugger regarding a resource. In step 510, the identity of the requested resource is verified from the request message. In step 520, the request is performed. In step 530, a response is sent to the request message with the result of the request.

Identifying the Target of a Request Message

With reference again to FIG. 3, as previously discussed, in one embodiment, the admin thread 345 is not owned by the trusted agent 325. In addition, the admin thread 345 may serve requests for multiple threads in one trusted agent 325 or in multiple trusted agents 325. In order for the admin thread 345 to be able to perform the request made in the request message the admin thread 345 needs to be able to identify the process or thread for which information is being requested. Where the request deals with reading and writing process memory, where a number of trusted agents 325 are running in the second execution environment 315, the specific trusted agent 325 for which process memory is requested must be identified. Where the request deals with getting and setting thread context for a particular thread, the admin thread 345 needs to be able to identify the specific thread for which the thread context is being requested.

In order to allow identification of the target (process or thread) of a request message, identifying information regarding each shadow process 320 and each shadow thread owned by the shadow process 320 are stored by in the second execution environment 315. In one embodiment, when a shadow process 320 creates a trusted agent 325, one of the pieces of information passed to the trusted agent 325 is a unique identifier of the shadow process 320. For example, where the first execution environment 310 is a version of the WINDOWS operating system from Microsoft Corporation which implements process environment blocks, the unique address of the process environment block (PEB) for the process is used as the unique process identifier. This information is persisted in the second execution environment 315 for the lifetime of the trusted agent 325, and is used when the admin thread 345 receives a request message, in order to match the request message to a trusted agent 325.

Similarly, when a shadow thread is created for scheduling a thread of the trusted agent 325, a unique identifier for the shadow thread is passed to the second execution environment 315 and persisted for as long as that trusted agent thread exists. For example, in one embodiment, such a unique identifier for a thread is the unique address of the first execution environment's bookkeeping information for the shadow thread, for example, the thread execution block (TEB) for the shadow thread or the KTHREAD (kernel thread) pointer.

The unique process or thread identifier is then included in request messages for the admin thread 345. When the admin thread 345 receives a request message, the unique process identifier and/or unique thread identifier in the request message is examined and used to ensure that the request in the request message can be matched to a trusted agent 325 and/or a specific thread of a trusted agent 325, so that the request can be executed in the correct context of the target trusted agent 325 and/or specific thread of a trusted agent 325.

The first execution environment 310 may be vulnerable to an attack, for example by an attacker presenting a request message with an invalid process identifier or thread identifier in an attempt to obtain information about threads in processes that are not being debugged. Thus, a check must be performed before the admin thread 345 responds to a request message. The check must verify that the request message regards a trusted agent 325 for which debugging has been permitted and for which debugging is ongoing.

Conclusion

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for initiating a bifurcated process to be debugged by a debugger, where said bifurcated process is scheduled using a shadow process running in a first execution environment and where said bifurcated process is executed using a trusted agent process running in a second execution environment, said method comprising:

initiating said shadow process in debug mode in said first execution environment, wherein the shadow process corn rises a shadow process thread;

initializing said trusted agent process in said second execution environment, wherein the trusted agent process comprises a trusted agent thread corresponding to the shadow process thread;

attaching said debugger to said shadow process;

once said debugger is attached, configuring said shadow process to schedule execution of said bifurcated process by said trusted agent.

2. The method of claim 1, where said initiating said shadow process comprises sending an agent image to said second execution environment.

3. The method of claim 1, where said initiating said shadow process comprises sending a notification that said bifurcated process should be debugged to said second execution environment.

4. The method of claim 1, where said initiating said shadow process comprises sending a unique identifier of said shadow process to said second execution environment.

5. The method of claim 1, where said initiating said shadow process in debug mode in said first execution environment comprises:
deferring the scheduling of execution of said bifurcated process by said trusted agent.

6. The method of claim 1, where said initializing said trusted agent process in said second execution environment comprises laying out process memory structures in memory.

7. The method of claim 1, where said initializing said trusted agent process comprises sending a unique shadow process identifier for said shadow process to said second execution environment.

8. The method of claim 7, where said unique shadow process identifier comprises a process environment block (PEB).

9. The method of claim 7, where said unique shadow process identifier is used to verify an identity of said bifurcated process when a request regarding process memory is sent by said debugger to said second execution environment.

10. The method of claim 7, where said initializing said trusted agent process further comprises sending a unique shadow thread identifier corresponding to each shadow thread of said shadow process to said second execution environment.

11. The method of claim 10, where said unique shadow thread identifier comprises a kernel thread (KTHREAD) pointer.

12. The method of claim 10, where said unique shadow thread identifier is used to verify an identity of trusted agent thread corresponding to said shadow thread corresponding to said unique shadow thread identifier when a request regarding thread context of said trusted agent thread is sent by said debugger to said second execution environment.

13. The method of claim 1, where said method further comprises:
determining whether debugging should be permitted on said bifurcated process, and aborting debugging of said bifurcated process if said determination concludes that debugging should not be permitted.

14. The method of claim 13, where said step of determining whether debugging should be permitted comprises:
determining whether a debugging flag is set for said bifurcated process.

15. A system comprising:
a first execution environment that comprises a scheduler, said first execution environment being adapted to schedule and dispatch a plurality of threads for execution on a processor, said first execution environment being further adapted to initiate a shadow process in debug mode in said first execution environment, to attach a debugger to said shadow process, and to, upon receipt of an indication that execution should begin, to schedule at least one thread of a trusted agent process on a second execution environment;
a second execution environment that is adapted to dispatch a plurality of second threads for execution on said processor, said second execution environment being further adapted to initialize said trusted agent process corresponding to said shadow process in said second execution environment, and to, upon completion of said initialization, send an indication that execution should begin to said first execution environment, wherein the trusted agent process includes a trusted agent thread that corresponds to a shadow process thread.

16. The system of claim 15, where said initiation of said shadow process comprises sending an agent image to said second execution environment.

17. The system of claim 15, where said initiation of said shadow process comprises sending a notification that said process should be debugged to said second execution environment.

18. The system of claim 15, where said initiation of said shadow process comprises sending a unique identifier of said shadow process to said second execution environment.

19. The system of claim 15, where said initiation of said shadow process in debug mode in said first execution environment comprises deferring the scheduling of execution of said bifurcated process by said trusted agent.

20. The system of claim 15, where said initiation of said trusted agent process comprises sending a unique shadow process identifier for said shadow process to said second execution environment.

21. The system of claim 20, where said unique shadow process identifier comprises a process environment block (PEB).

22. The system of claim 20, where said unique shadow process identifier is used to verify an identity of said shadow process when a request regarding process memory is sent by said debugger to said second execution environment.

23. The system of claim 15, where said initiation of said trusted agent process farther comprises sending a unique shadow thread identifier corresponding to each shadow thread of said shadow process to said second execution environment.

24. The system of claim 23, where said unique shadow thread identifier comprises a kernel thread (KTHREAD) pointer.

25. The system of claim 23, where said unique shadow thread identifier is used to verify an identity of trusted agent thread corresponding to said shadow thread corresponding to said unique shadow thread identifier when a request regarding thread context of said trusted agent thread is sent by said debugger to said second execution environment.

26. The system of claim 15, wherein said first execution environment comprises a first operating system, and wherein said second execution environment comprises a second operating system.

27. The system of claim 15, wherein the first execution environment is expected to conform its behavior to a first specification, wherein said second execution environment is expected to conform its behavior to a second specification, and wherein the expectation that the second execution environment will behave according to the second specification is relatively greater than the expectation that the first execution environment will conform its behavior to the first specification.

28. The system of claim 15, where said second execution environment further determines whether debugging should be permitted on a bifurcated process, and aborts debugging of said bifurcated process if said determination concludes that debugging should not be permitted.

29. The system of claim 28, where said determination is based on whether a debugging flag is set for said bifurcated process.

30. A system comprising:
a first execution environment that comprises a scheduler, said first execution environment being adapted to schedule and dispatch a plurality of first threads for execution on a processor, said first execution environment running at least one shadow process comprising at least one shadow process thread, where a debugger is attached to said shadow process;
a second execution environment that is adapted to dispatch a plurality of second threads for execution on said processor, said second execution environment running at least one trusted agent, each of said at least one trusted agent corresponding to one of said at least one said shadow process, where each of said at least one trusted agent comprising at least one trusted agent thread, where each of said trusted agent threads corresponds to one of said shadow process threads, where a bifurcated process comprises said shadow process and said trusted agent and is scheduled using said shadow process and executed using said trusted agent, and where said second execution environment is adapted to (a) receive a request message from said debugger regarding a resource; (b) verify an identity of said requested resource from said request message; (c) perform the request in said request message; and (d) respond to said request message with the result of said request.

31. The system of claim 30, where said request message comprises a request selected from among the following group: a request to get thread context for one of said trusted agent threads; a request to set thread context for one of said trusted agent threads; a request to read process memory for said trusted agent process; and a request to write process memory for said trusted agent process.

32. The system of claim 30, where said second execution environment stores unique identifier information for each possible resource for which a valid request may be made, and where said verification of an identity of said requested resource comprises determining whether said resource is one of said possible resources for which a valid request may be made.

33. The system of claim 30, where said second execution environment stores identifier information comprising unique process identifier information for said shadow process and unique thread identifier information for said shadow threads, and said verification of said requested resource from said request message comprises using said identifier information to identify the resource in said second execution environment.

34. The system of claim 30, wherein said first execution environment comprises a first operating system, and wherein said second execution environment comprises a second operating system.

35. The system of claim 30, wherein the first execution environment is expected to conform its behavior to a first specification, wherein said second execution environment is expected to conform its behavior to a second specification, and wherein the expectation that the second execution environment will behave according to the second specification is relatively greater than the expectation that the first execution environment will conform its behavior to the first specification.

36. The system of claim 35, wherein a criterion determines whether running the second thread would cause the second execution environment to behave in a manner that would violate the second specification.

37. A method for debugging a bifurcated process comprising:
scheduling a bifurcated process using a shadow process including at least one shadow thread running in a first execution environment and where said bifurcated process is executed using a trusted agent process running in a second execution environment, wherein said trust agent includes trusted agent threads, each of said trust agent threads corresponding to one of said shadow process threads;
receiving a request message from a debugger regarding a resource; verifying an identity of said requested resource from said request message; performing the request in said request message; and responding to said request message with the result of said request.

38. The method of claim 37, where said steps of receiving a request message from said debugger regarding a resource, verifying the identity of said requested resource from said request message, performing the request in said request message, and responding to said request message with the result of said request are performed by an admin thread running in said second execution environment.

39. The method of claim 38, where said admin thread is owned by said bifurcated process.

40. The method of claim 37, where said request message comprises a request selected from among the following group: a request to get thread context for one of said trusted agent threads; a request to set thread context for one of said trusted agent threads; a request to read process memory for said trusted agent process; and a request to write process memory for said trusted agent process.

* * * * *